United States Patent
Uetabira

(10) Patent No.: US 9,369,869 B2
(45) Date of Patent: Jun. 14, 2016

(54) METHOD AND SYSTEM FOR AUTOMATIC LOGON SUPPORT WITHOUT MANUAL INPUT OF CREDENTIALS

(71) Applicant: INTERMAN Corporation, Kagoshima (JP)

(72) Inventor: Shigeki Uetabira, Kagoshima (JP)

(73) Assignee: INTERMAN Corporation, Kagoshima (JP)

( * ) Notice: Subject to any disclaimer, the term of this patent is extended or adjusted under 35 U.S.C. 154(b) by 278 days.

(21) Appl. No.: 13/715,622

(22) Filed: Dec. 14, 2012

(65) Prior Publication Data

US 2014/0173110 A1    Jun. 19, 2014

(51) Int. Cl.
*G06F 15/16* (2006.01)
*H04W 12/08* (2009.01)

(52) U.S. Cl.
CPC ........................ *H04W 12/08* (2013.01)

(58) Field of Classification Search
CPC ................................................. H04W 12/08
USPC .......... 709/217, 219, 223, 224, 225, 227, 228
See application file for complete search history.

(56) References Cited

U.S. PATENT DOCUMENTS

| | | | |
|---|---|---|---|
| 6,795,856 B1 * | 9/2004 | Bunch ................. | H04L 12/2602 709/224 |
| 7,596,804 B2 * | 9/2009 | Toomey et al. ................... | 726/5 |
| 7,823,199 B1 * | 10/2010 | Rathi et al. ........................ | 726/22 |
| 8,191,117 B2 * | 5/2012 | Lapidous ........................... | 726/4 |
| 8,533,800 B2 * | 9/2013 | Jin et al. ............................ | 726/7 |
| 2011/0167440 A1 * | 7/2011 | Greenfield ........................ | 725/25 |
| 2013/0102283 A1 * | 4/2013 | Lau et al. ........................ | 455/411 |

FOREIGN PATENT DOCUMENTS

| | | |
|---|---|---|
| JP | H10301950 A | 11/1998 |
| JP | 2003505788 A | 2/2003 |
| JP | 2005202653 A | 7/2005 |
| JP | 2005-332282 | 12/2005 |
| JP | 2006144421 A | 6/2006 |
| JP | 2006285357 A | 10/2006 |
| JP | 2008158683 A | 7/2008 |

(Continued)

OTHER PUBLICATIONS

Takao Imazawa et al.; "Positional Authentication System Using GPS Data and the Stopping Point Calculating Method"; Computer Security Symposium 2008 Proceedings [Part II ]; Japan, Information Processing Society of Japan; Oct. 8, 2008; vol. 2008; No. 8, pp. 707-712.

(Continued)

*Primary Examiner* — Viet Vu
(74) *Attorney, Agent, or Firm* — Maier & Maier, PLLC

(57) ABSTRACT

An automatic logon support method and system enable a user having an access right to easily access a website on the Internet through a mobile communication device without asking the user to manually input a credential. Information about a history of when and where the mobile communication device is located is collected and stored in the mobile communication device itself. The server which hosts the website determines whether to allow a mobile communication device to access the server on the basis of the location information history stored in the mobile communication device.

12 Claims, 9 Drawing Sheets

(56) References Cited

FOREIGN PATENT DOCUMENTS

| | | |
|---|---|---|
| JP | 2009289172 A | 12/2009 |
| JP | 2010039869 A | 2/2010 |

OTHER PUBLICATIONS

Yuuki Ishihara et al; Path-Pass: The Authentication System Using Location Information; Graduate School of Information System, The University of Electro-Communications; Tokyo, Japan; Oct. 2006; pp. 537-542.

Japanese Office Action from corresponding Japanese Application No. 2011-149277; Dec. 19, 2014; 6 pgs.

Eiji Okamoto et al; "Cryptogram Technology For Realization of A Bright Information Society: 5 Distribution Management of Cipher Keys"; Bit, vol. 23, No. 12; Nov. 1, 1991, Kyoritsu Shuppan Co., Ltd., pp. 51-59.

* cited by examiner

Fig. 2

| No. | Date | Time | Latitude | Longitude | Cell-ID | Sensitivity |
|---|---|---|---|---|---|---|
| ..... | ..... | ..... | ..... | ..... | ..... | ..... |
| 00014238 | 20110103 | 181119 | 35.682712 | 139.750299 | 10918 | 78 |
| 00014239 | 20110103 | 181131 | 35.681370 | 139.748938 | 10916 | 81 |
| ..... | ..... | ..... | ..... | ..... | ..... | ..... |

METHOD AND SYSTEM FOR AUTOMATIC LOGON SUPPORT WITHOUT MANUAL INPUT OF CREDENTIALS

BACKGROUND OF THE INVENTION

1. Field of the Invention

The present invention relates to an automatic logon support method and an automatic logon support system for helping a user to easily access a website on the Internet through a mobile communication device.

2. Discussion of the Prior Art

In recent years, smartphones, cellular phones, PHS (Personal Handyphone System) and the like mobile terminals have continued to spread into a broad range of applications. Particularly, besides basic verbal communication functionality, the data communication capabilities of these terminals have been enhanced to provide users with a variety of information services through the Internet. On the other hand, it is often desired to limit users to which information services are provided. Users can be identified, for example, by the use of an ID/password pair given to each user or an identification number assigned to each mobile terminal (refer to Japanese Patent Published Application No. 2005-332282).

However, the use of ID/password pairs requires users to perform troublesome operations for registration and verification and makes these services bothersome. While the use of the identification numbers assigned to mobile terminals is very simple, there are doubts about security, and it is difficult to effectively use it for smartphones having spread rapidly in recent years.

Taking into consideration the above circumstances, it is an object of the present invention to provide an automatic logon support method and an automatic logon support system which enable a user having an access right to easily access a website on the Internet through a mobile communication device without asking the user to manually input a credential.

SUMMARY OF THE INVENTION

To achieve at least one of the abovementioned objects, a computer implemented method of the present invention performs an automatic logon process through the Internet where at least one server and a mobile communication device are connected, and comprises: a step of collecting a plurality of records for storing information about a history of when and where the mobile communication device is located; a step of evaluating, when the mobile communication device tries to access the server, the plurality of records to determine how frequently the mobile communication device has visited a predetermined location; and a step of allowing the mobile communication device to access the server if the frequency that the mobile communication device has visited the predetermined location meets a predetermined requirement.

Preferably, in the invention as described above, the plurality of records are stored in the storage device of the mobile communication device.

Preferably, in the invention as described above, the mobile communication device has the capability of detecting a current location of the mobile communication device itself, and wherein the plurality of records are obtained through the current location detecting capability of the mobile communication device.

Preferably, in the invention as described above, the mobile communication device has the capability of detecting a current location of the mobile communication device itself, and wherein the plurality of records are obtained through the current location detecting capability of the mobile communication device.

Preferably, in the invention as described above, the current location acquiring function is performed by the use of one or combination of GPS, Wi-Fi triangulation, and cell phone tower triangulation.

Preferably, in the invention as described above, the computer implemented method further comprises: Wi-Fi communication device installed in the predetermined location, wherein the mobile communication device has a Wi-Fi communication capability, and wherein when the mobile communication device accesses the Wi-Fi communication device, the Wi-Fi communication device returns data to be collected as one of the plurality of records.

Preferably, in the invention as described above, the plurality of records are associated with information about the predetermined location, and wherein each record includes information about when the mobile communication device is located in the predetermined location but does not include information about where the mobile communication device is located.

Preferably, in the invention as described above, the plurality of records consists of pairs each of which consists of one record indicative of when the mobile communication device entered the predetermined location and the other record indicative of when the mobile communication device left the predetermined location.

Preferably, in the invention as described above, each of the plurality of records includes information about when the mobile communication device entered the predetermined location and information about how long the mobile communication device has stayed in the predetermined location.

Preferably, in the invention as described above, if the frequency that the mobile communication device has visited the predetermined location meets the predetermined requirement, the server requests the mobile communication device to present another credential, and if the mobile communication device returns a correct credential, the server allows the mobile communication device to access the server.

Preferably, in the invention as described above, the server accepts a password as the credential presented by the mobile communication device.

Preferably, in the invention as described above, the step of collecting a plurality of records comprising: a step of connecting the mobile communication device with a wireless LAN device which is installed in the predetermined location; a step of transmitting information about the connection between the mobile communication device and the wireless LAN device from the wireless LAN device to the mobile communication device; and a step of storing the plurality of records in the mobile communication device on the basis of the information about the connection transmitted from the wireless LAN device.

Preferably, in the invention as described above, the information transmitted from the wireless LAN device about the connection between the mobile communication device and the wireless LAN device is information about the current date and time which is encrypted.

Preferably, in the invention as described above, the encryption of the information about the connection is performed by the use of a first key which is stored in the mobile communication device and a second key which is not stored in the mobile communication device but stored in the server.

Preferably, in the invention as described above, the first key is not stored in the server, and wherein when trying to access the web server, the mobile communication device transmits the first key to the server.

Preferably, in the invention as described above, the wireless LAN device is connected with the Internet, and wherein if the frequency that the mobile communication device has visited the predetermined location meets the predetermined requirement, the wireless LAN device provides Internet access for the mobile communication device.

Preferably, in the invention as described above, the server hosts a web site through the Internet, and wherein if the frequency that the mobile communication device has visited the predetermined location meets the predetermined requirement, the mobile communication device is allowed to access the web site.

Preferably, in the invention as described above, the plurality of records are stored in the mobile communication device as a cookie of a browser for viewing the web site.

Preferably, in the invention as described above, the computer implemented method further comprises: Wi-Fi communication device installed in the predetermined location; and a computer connected to the Wi-Fi communication device, wherein the mobile communication device has a Wi-Fi communication capability, and wherein when the mobile communication device accesses the Wi-Fi communication device, the computer stores a current time record in the computer itself to be collected as one of the plurality of records in association with said mobile communication device.

On the other hand, an automatic logon support system of the present invention comprises: a mobile communication device and a server connected through the Internet, said mobile communication device being configured to perform the following operations: detecting a current location of the mobile communication device itself; storing information as plurality of records about a history of when and where the mobile communication device is located, the information being obtained through the current location detecting capability; said mobile communication device being configured to perform the following operations: evaluating, when the mobile communication device tries to access the server, the plurality of records to determine how frequently the mobile communication device has visited a predetermined location; and allowing the mobile communication device to access the server if the frequency that the mobile communication device has visited the predetermined location meets a predetermined requirement.

BRIEF DESCRIPTION OF THE DRAWINGS

The objects and features of the present invention will become more apparent from consideration of the following detailed description taken in conjunction with the accompanying drawings in which:

FIG. 2 is view to show the structure of the history database for use in the automatic logon support system according to Example 1 of the present invention.

DESCRIPTION OF THE PREFERRED EMBODIMENTS

In what follows, automatic logon support methods and systems according to several embodiments of the present invention will be explained with reference to the accompanying drawings. It is assumed that mobile communication devices for use in the automatic logon support systems are capable of accessing the Internet. More specifically speaking, these mobile communication devices include conventional feature phones, multifunction terminals called smartphones having touch-panel screens, tablet computers, notebook computer and the like. The location information of a mobile communication device can be provided from GPS, Wi-Fi triangulation, cell phone tower triangulation and/or the like system.

Example 1

In this exemplary embodiment of the invention, a web server of a university allows students and staffs attending this university to access a web site of the web server without IDs and passwords through their mobile communication devices by determining that these mobile communication devices are owned by them. On the other hand, the web site requires an ID and a password when the terminal accessing the web site cannot be identified as carried by such a student or staff.

Figure 1:
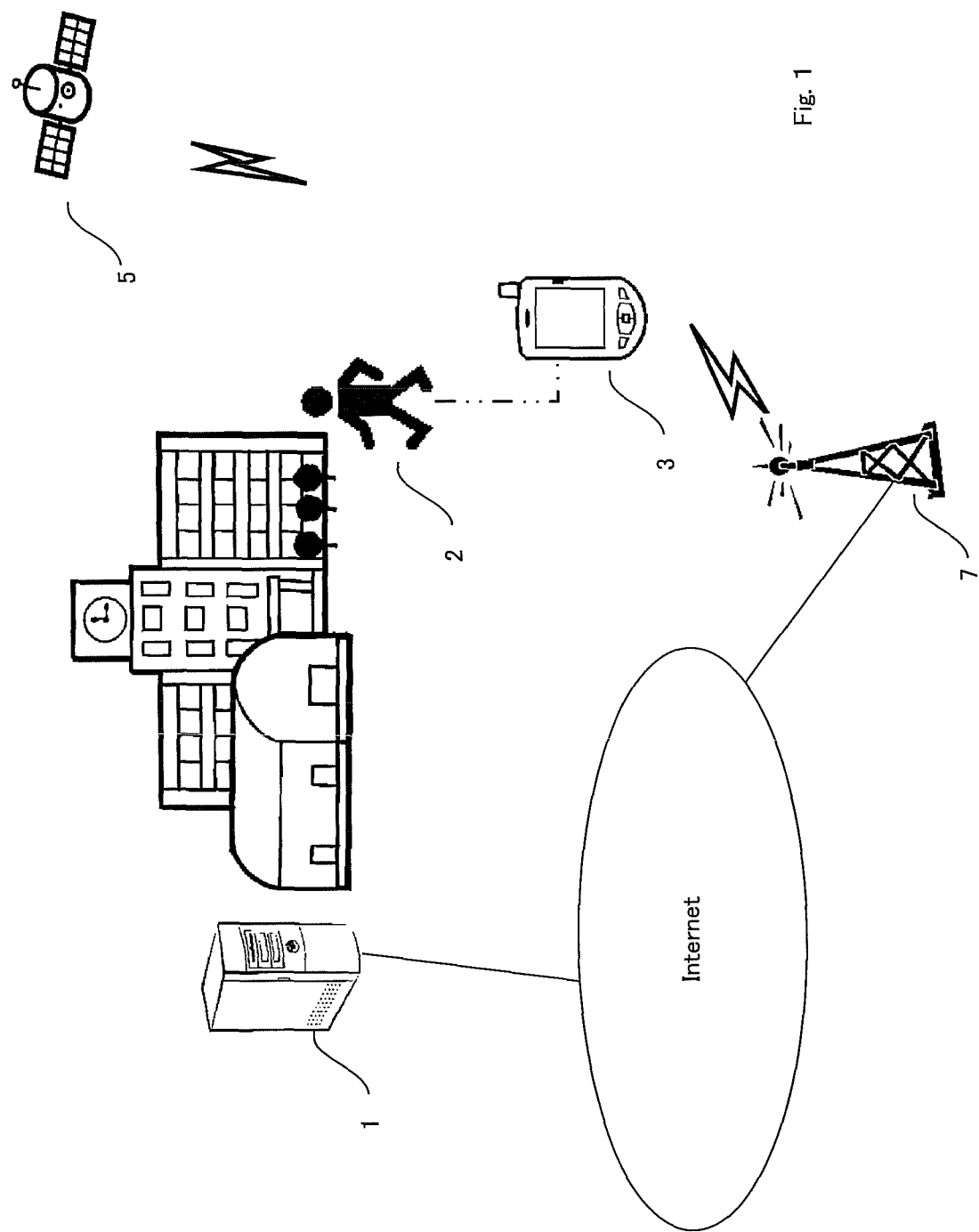
FIG. 1 is a view for showing the overall configuration of an automatic logon support system according to Example 1 of the present invention.

FIG. 1 is a view for showing the overall configuration of an automatic logon support system according to Example 1 of the present invention through which users accesses the web site of the university. This automatic logon support system is built in an implementation environment comprising a mobile communication device 3 provided with the communication capability of accessing the Internet and the capability of detecting the current location of the mobile communication device 3 itself, and a server providing the web site of the university accessible through the Internet. That is, the automatic logon support system is installed in this implementation environment by installing a client program on the mobile communication device 3 and installing an authentication program in a server 1 of the university. Of course, the client program are installed in many mobile communication devices (represented here by the mobile communication device 3) owned by students and staffs attending the university (represented here by a user 2 of the mobile communication device 3). Namely, this system includes the authentication program installed in the server 1 of the university, and a browser and a utility program installed in the mobile communication device 3 used by the user 2. The client program includes this utility program and the auxiliary software component. In accordance with this example, necessary functionality for this system is implemented within the browser as described below. This functionality may be implemented as an auxiliary software component, for example, plug-in, added to the browser.

The utility program periodically acquires the current location information of the mobile communication device 3 provided from GPS, Wi-Fi triangulation, cell phone tower triangulation and/or the like, and accumulates a history of location information in an internal storage of the mobile communication device 3. This location information history is stored in a database having a structure as illustrated in FIG. 2. This history database contains location records each of which includes a field holding a date, a field holding a time, a field holding a latitude, a field holding a longitude, a field holding a Cell-ID, a field holding a receiving sensitivity. In response to a timer event, the utility program creates a location record indicating that the mobile communication device 3 has been located in the current location stored in the latitude and longitude fields on the date and time stored in the date and time fields and communicated with a base station 7 identified by the Cell-ID field with the receiving sensitivity stored in the receiving sensitivity field.

However, a new record is accumulated only when the current location is changed. For example, if the mobile communication device 3 is located in a certain place for a hour, a record at 13:30 may be followed by a record at 14:30. The Cell-ID and sensitivity fields can be used, for example, for evaluating the reliability of the latitude and longitude fields as reference data.

When a user accesses the web site of the university, the server 1 of the university requests the mobile communication device 3 to send the location information history. This request is performed, for example, by returning a html file including a command such as "getGeoLocationHistory". The command is accompanied with parameters indicative of the location of the university, i.e., ranges of latitude and longitude. The browser is implemented with the functionality of interpreting this command, extracting the location history data in the geographical area corresponding to the parameters from the history database, and returning the location history data to the server 1 of the university. For example, if the parameters are a latitude of 35.682712 degrees, a longitude of 139.750299 degrees, a latitude range of 0.001 degree, and a longitude range of 0.001 degree, a set of records having latitudes between 35.681712 degrees and 35.683712 degrees and longitudes between 139.749299 degrees and 139.751299 degrees is returned to the server 1 of the university.

The server 1 of the university evaluates the location history data, and determines whether or not to allow the user 2 to access the web site. The determining criteria include, for example, how many days the user 2 visited this university within the past one month. For example, if 15 days or more the user 2 has visited the above geographical area within the past one month, the user 2 is granted an access right and allowed access to the web site, otherwise access is denied. Namely, this location history data is used as a credential. Consideration may be paid such that after summer vacation the location history data one month before the vacation is used for determination. Even if access is denied, a conventional authentication process starts by asking for the user 2 to enter an ID and a password, and allows access if these are correct.

The above authentication process using the location information history is a simplified access control method, and particularly effective when it is desired to easily control access by ordinary users. Also, it is possible to furthermore effectively utilize the authentication process using the location information history by combining it with the conventional authentication process for better security. Namely, while access to ordinary information is allowed simply by evaluating the location information history, access to sensitive information is allowed only after the user 2 inputs a correct ID and a correct password.

Furthermore, the authentication process can make use of timely information. For example, weights may be added to records in the time slots of lectures at the university. In one specific implementation, two records outside the lecture time slots may be treated equivalent to one record in the lecture time slots.

This example is directed to the authentication process for accessing the web site of the university. The same system can be applied to an authentication process for accessing the web site of any other establishment, for example, a school, a laboratory, a community center, a working place such as a company, a laboratory, a municipal office, and so forth such that a person acting in the establishment can easily access the web site or other network of the establishment without troublesome operations.

In addition to this, the system can be implemented within a home wireless LAN router to control access to the home wireless LAN. Conventionally, a troublesome procedure is needed to access a wireless LAN particularly just after a router is installed. Namely, when the wireless LAN router receives a request for connecting a network from the mobile communication device 3, it requires the utility program of the mobile communication device 3 to transmit the location information history near the home. If the user 2 is a family member of the home, a great number of records near the home shall be accumulated, and thereby if there are a few such records the access is denied. For example, it is avoided that somebody else can easily access only when passing near the home with the mobile communication device 3.

In the case of Example 1, when accessed by the mobile communication device 3, the server 1 of the university returns a html file containing the command to require the location information history. The browser of the mobile communication device 3 is implemented with an auxiliary program such as a plug-in which detects and interprets the command. However, it is possible to use a conventional browser as it is while the utility program is designed to accept a request for the location information history and return the requested data.

Namely, when accessed by the mobile communication device 3, the authentication program of the server 1 sends a request for the location information history to the utility program of the mobile communication device 3.

In this case, the utility program accepts the request through a predetermined port, and returns the location information history. The authentication program performs authentication on the basis of the location information history as received, and returns a start page of the web site if the authentication succeeds. If the authentication fails, the authentication program returns a conventional authentication page for prompting the user to input an ID and a password.

Example 2

In accordance with this example, location information is confirmed by the use of measurement instruments which are built in the mobile communication device 3. The measuring results are stored as fields of each record in addition to the fields as described in accordance with Example 1. The measuring results may include the temperature, degree of humidity, atmospheric pressure near the mobile communication device 34. The server 1 can evaluate the reliability of the location information by comparing the measuring results as stored in the records with data available in the Internet corresponding to the time, date and location as stored in the records. If there is a mismatch between the measuring results and the publicly-available information, it is determined that the location information does also not coincide with real locations, and the access is denied. This is effective to prevent falsification.

Example 3

In accordance with this example, access to a site is allowed only to mobile communication devices that transmit the location information of a particular location. For example, it is possible to allow only persons attending a certain event to access a special site about this event. Also, it is possible to accept or reject messages posted on a microblog service in accordance with the location information from mobile communication devices. For example, when a hashtag is used to post messages as relevant to a certain event, it is possible to accept messages with the hashtag only in cases where these messages are sent from mobile communication devices near the event hall.

Example 4

Figure 3:
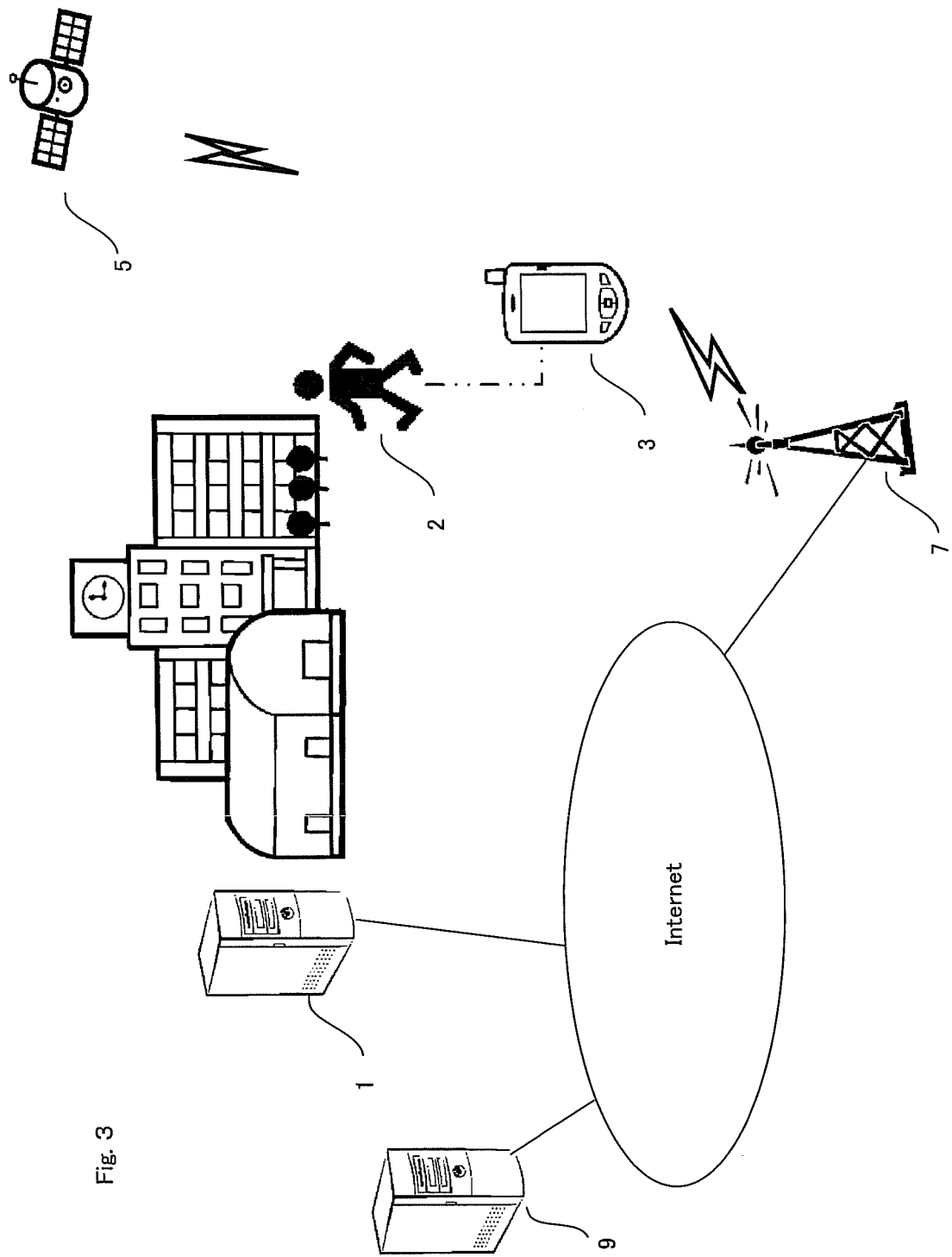
FIG. 3 is a view for showing the overall configuration of an automatic logon support system according to Example 4 of the present invention.

In accordance with this example, a logon intermediary server 9 is used (refer to FIG. 3). A web site that desires to use the automatic logon support system accesses this logon intermediary server 9, and registers a URL for accumulating location information history in association with a geographical area which the web site designated. Also, a utility program is installed in the mobile communication device 3 own by the user 2, and a cookie processing algorithm is installed in the server 1 of the web site as described below.

The utility program periodically accesses the logon intermediary server 9 (typically at intervals of several minutes, for example, every ten minutes in this case). The logon intermediary server 9 acquires the current location of the mobile communication device 3 and returns the location information accumulating URL of the web site associated with the current location.

This location information accumulating URL is a URL for storing the location information history in the mobile communication device 3. Receiving the URL, the utility program accesses this URL, which is for example located in the web site of the above university. The web site which is accessed returns the location history information of the mobile communication device 3, and the location history information is stored as a cookie in this mobile communication device 3. If the previous location information history has already been stored in the mobile communication device 3 as a cookie, the web site receives this previous location information history from the utility program, updates the location information history by appending a new record to the previous location information history, and returns the updated location information history to the mobile communication device 3. At this time, the web site may acquire the current location from the mobile communication device 3 and confirms the location with reference to the geographical area as registered.

In this case, the location information history may not contain actual geolocation information. This is because the cookie is stored only when the current location is within the geographical area as registered. Accurately, the geolocation information corresponds to the URL (domain) associated with the cookie, and the history thereof is accumulated as the time record. A sequence of time records as a cookie is thereby called here as location information history.

Incidentally, for security reasons, it is desirable to update the location information accumulating URL at intervals of several minutes (for example, every five minutes in this case). The web site can update the location information accumulating URL by accessing the logon intermediary server 9 at intervals of several minutes. For example, if the URL is generated with a random number, for example, as "daigaku.ac.jp/iew8s.html" in which "iew8s" is the random number, the URL can be updated as "daigaku.ac.jp/iew7.html" in which "iew7" is a random number which is generated anew. However, even after updating, the previous URL "daigaku.ac.jp/iew8s.html" is kept as valid for several minutes (for example, five minutes).

In this embodiment, the cookie is data consisting of a series of date and time information. One item of the date and time information is an integer counted every ten minutes from 00:00 Jan. 1, 2000 which is converted to an integer 0. For example, 01:00 Jan. 1, 2000 is converted to an integer 6. If one data item is represented by a 3-byte unsigned integer, the data shall not overflow for three hundred years. The value of a cookie consists of characters, and thereby one 3-byte data item is converted to four characters by Base64. The 3-byte data item is called here a time record.

The cookie includes a pair of time records, one being indicative of date and time when entering the geographical area, the other being indicative of date and time just before leaving the geographical area. If data items of a pair are the same, i.e., if the user 2 is stayed in the geographical area for at most only ten minutes, the pair is not recorded. In practice, when the user 2 enters the geographical area, a pair of time records having the same date and time are appended to the cookie. If the user 2 remains in the geographical area, the latter record of the latest record pair is replaced every ten minutes by a new time record. If the new time record and the latter record of the latest record pair have successive values, i.e., if there is only an interval of 10 minutes between these records, it is determined that the user 2 remains in the geographical area. If the user 2 does not remain in the geographical area, i.e., the user 2 is stayed in the geographical area for at most only ten minutes, the time record pair of the same data items remains in the cookie after the user 2 leaves the geographical area. However, when the user 2 enters the geographical area again, the web site deletes the time record pair of the same data and adds a new time record pair to the cookie. The cookie is therefore not updated if the user 2 has merely passed through the geographical area.

It is thereby possible to know how long the user 2 has stayed in the geographical area, for example, near the university. Since there is a cookie size limit in many browsers, cookies are generated one per month for recording monthly data. The name of each cookie includes year and month names.

For example, a cookie named "201109" is used to store records on September, 2011. If there are 10 records a day on average, the number of records is about 600 per month. Since one time record consists of four characters, one cookie consists of about 2400 characters.

In this case, a pair of records is considered substantially as one record indicative of the time and place, and the period (sojourn period) for which the mobile communication device 3 remains the place. This record pair can be compressed as follows. Namely, after entering and leaving the geographical area, a pair of records are stored in the mobile communication device 3 as has been discussed above. When the mobile communication device 3 enters the geographical area again, the web site calculates the difference between the latest record pair. For example, if the sojourn period is 30 minutes, the difference is 3. If the difference of the latest record pair (which can be in a past month cookie) is 0, the web site deletes the record pair, followed by appending a new pair of time records. If not 0, the web site deletes the latter record of the latest record pair, encodes the difference by Base64 as an integer, and adds one character (the encoded integer indicative of the sojourn period) and the new pair of time record to the cookie. The numeric value represented by Base64 is from 0 to 63 so that the sojourn period information is 630 minutes at a maximum. If the difference exceeds 63, the sojourn period information is recorded as 630 minutes, i.e., 63 encoded as '/'.

The location history data as to how many times the user stayed in a certain place can thereby be accumulated in a very simple manner. This system can be applied not only to the automatic logon support system as described above, but also to several purposes such as sales promotion and marketing. For example, when the user enters a restaurant, the utility program automatically accumulates the location history data by accessing the location information accumulating URL of the restaurant. If the user accesses the home page of the restaurant, the location history data as accumulated is sent to the home page. It is then possible to provide a coupon to a customer who frequently visits the restaurant with reference to the location history data.

Example 5

Figure 5:
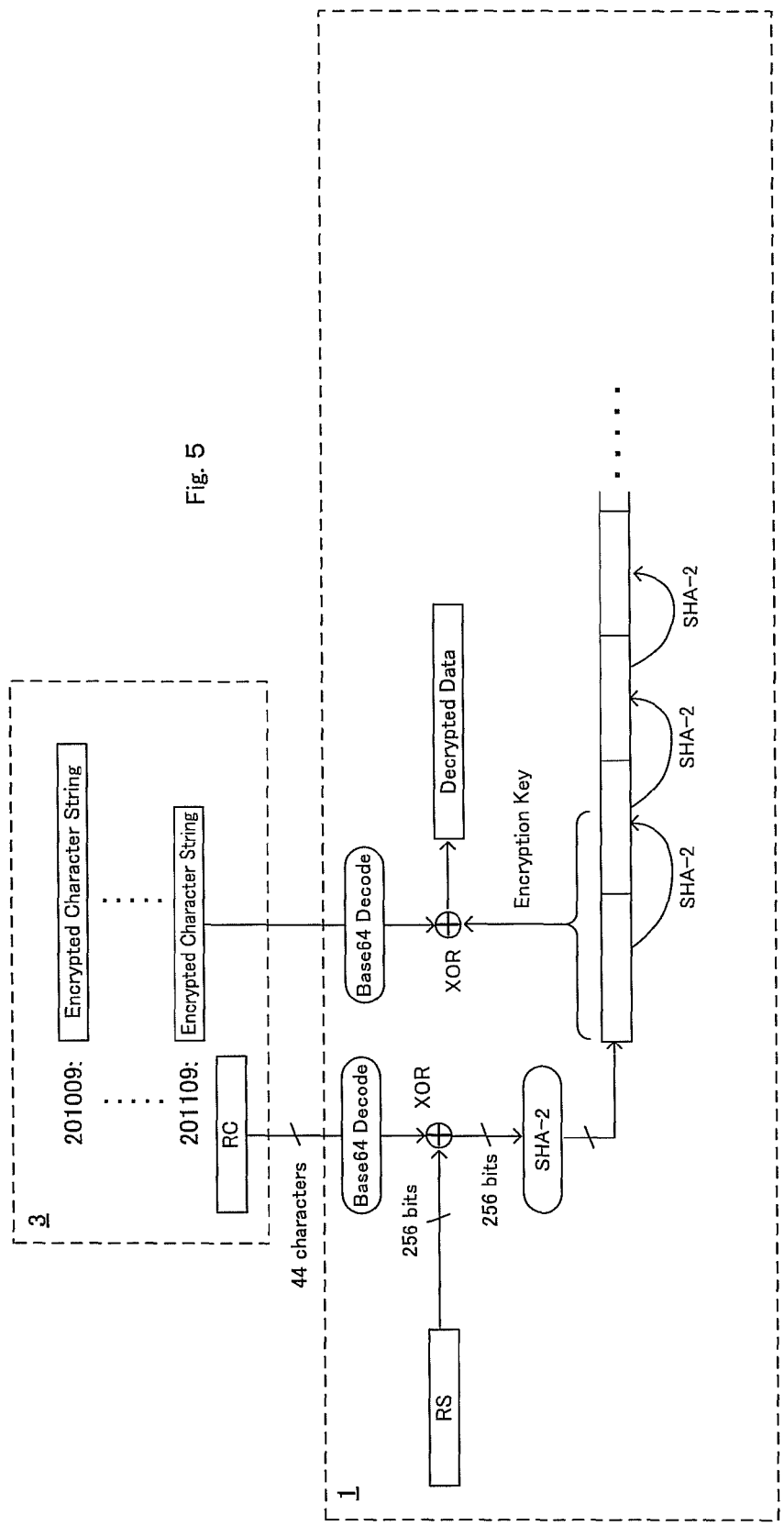
FIG. 5 is a view for explaining the encryption algorithm for use in the automatic logon support system according to Example 4 of the present invention.
Figure 6:
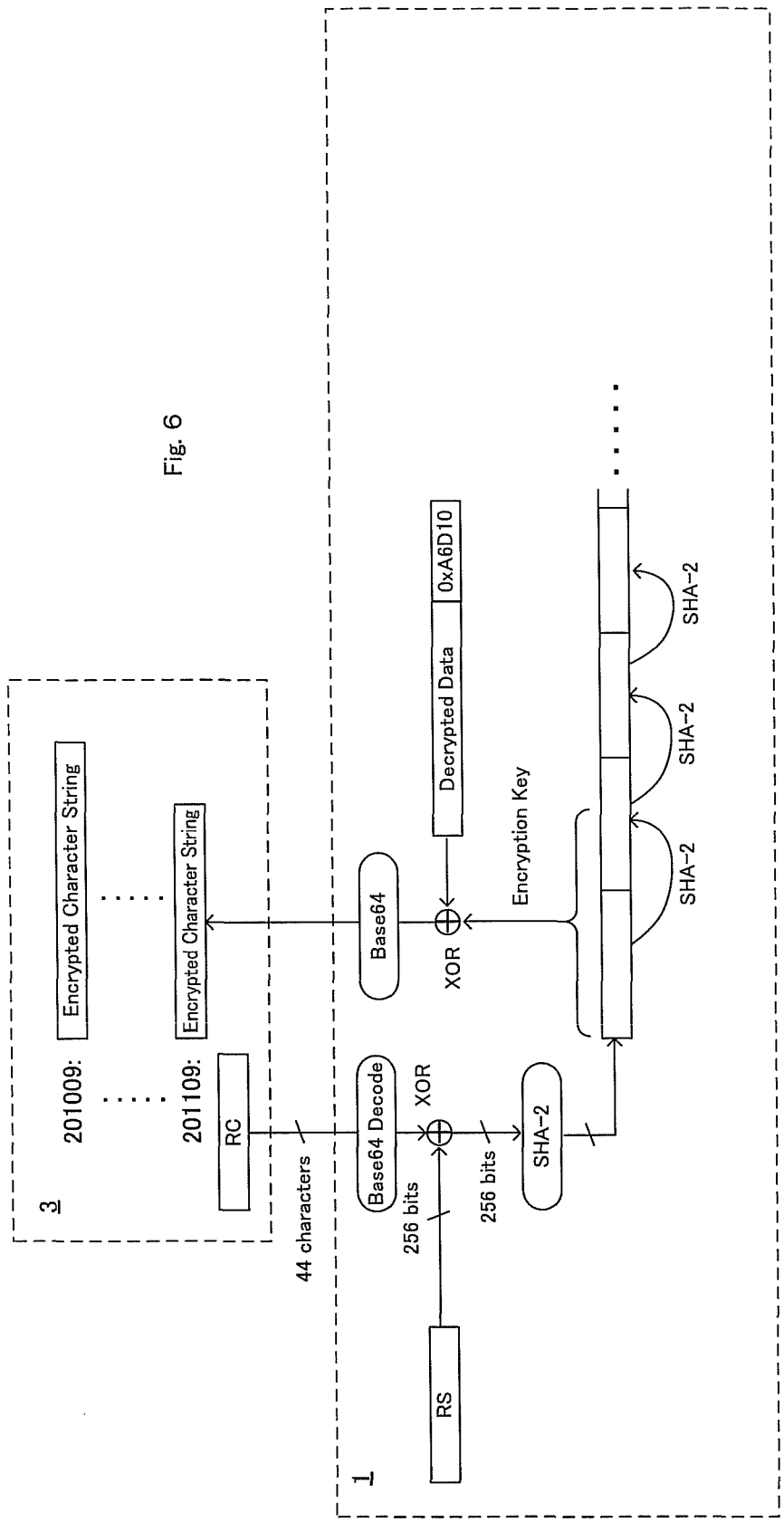
FIG. 6 is a view for explaining the encryption algorithm for use in the automatic logon support system according to Example 4 of the present invention.

In accordance with the above examples, the location information history is stored in the mobile communication devices owned by users. Accordingly, there is the possibility that the location information history is tampered at the user end. Encryption may be used to prevent such tampering. An example will be explained with reference to FIG. 4 to FIG. 6. An encryption algorithm is implemented here in the system of Example 4. The encryption algorithm is performed by the use of two keys.

When the mobile communication device 3 enters the geographical area for the first time, the server 1 generates a 256 bit random number RC as one of the two keys, converts this random number RC into a base64 character string, and stores the character string as a cookie, which is associated with the domain name of the server 1 and named for example "CKey", in the mobile communication device 3. Since the domain name of the server 1 is known from the URL obtained from the logon intermediary server 9, the random number RC may be generated and saved as a cookie in the mobile communication device 3 side. This random number RC is stored only in this mobile communication device 3 and different from the random numbers of the mobile communication devices of the other users. On the other hand, there is a random number RS which is stored in the server 1 as the other key. This random number RS is kept secret and commonly used for exchanging data with all the users as described below.

When the mobile communication device 3 enters the geographical area, the utility program accesses the server 1 to accumulate a time record as the location information history in the same manner as in Example 4. However, in this case, the utility program sends the random number RC to the server 1 which encrypts the location information history by the use of the random number RC together with the random number RS, and returns the encrypted location information history as an updated cookie as described below. Namely, at first, an encryption key is calculated by bitwise XORing the random number RC and the random number RS together, calculating a hash chain of the XOR value by the SHA-2 hash function, and extracting a bit sequence from the LSB of the concatenation of the hash values of the hash chain corresponding to the bit length of the location information history. Since the hash value in this case is 256 bits, for example, if the SHA-2 hash function is successively applied to the XOR ten times, a hash chain consists of ten hash values which are concatenated into a 2560 bit sequence.

Figure 4:
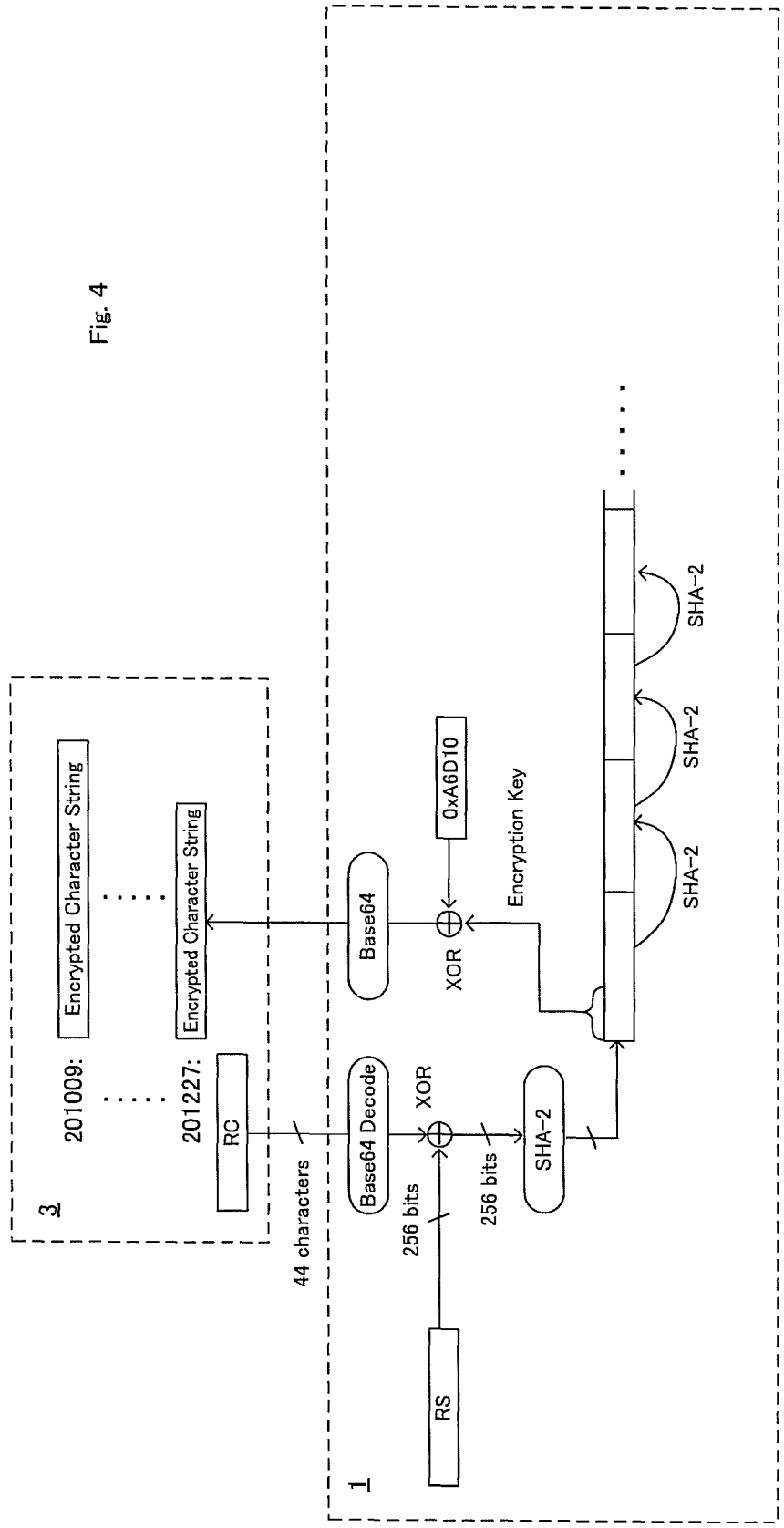
FIG. 4 is a view for explaining the encryption algorithm for use in the automatic logon support system according to Example 4 of the present invention.

Referring to FIG. 4, if the date and time information is 00:00 Dec. 27, 2012, the time record is 0xA6D10, which would be converted to "Cm0Q" by Base64 as it is. When the mobile communication device 3 enters the geographical area, the server 1 attempts to have a cookie named "201212". If the mobile communication device 3 enters for the first time in this month, no cookie is returned. In this case, the time record data 0xA6D10 is bitwise XORed with 24 bits of the encryption key from the LSB, converted into a character string by Base64, and returned as the encrypted character string of a cookie named "201212".

If the mobile communication device 3 has entered the geographical area several times, the current value of the cookie is returned to the server 1, which appends new time record to the cookie after confirming that the value of the cookie is correct by the following verification process. First, the Base64 character string which is transmitted from the mobile communication device 3 as the value of the cookie is decoded to obtain the value of the cookie named the current month, i.e., "201212" in this case, as encrypted binary data of the location information history (refer to FIG. 5). Also, the value of the cookie named "CKey" is obtained, and decoded to a bit sequence of binary data, which is the random number RC. An encryption key which is 24 bits longer than the current value of the cookie is then calculated by the use of the random number RC and the random number RS. The additional 24 bits are provided for the new time record.

The location information history is obtained by bitwise XORing the encryption key with the location information history in an encrypted binary form. Each of the time records of the location information history is verified as correct data in December 2012. Also, it is verified that these time records are arranged in ascending order. If there is an inconsistent record, the server 1 notifies the mobile communication device 3 of this fact, followed by terminating the process. If there is no inconsistent record, the new time record of 0xA6D10 is appended to the decrypted location information history which is then XORed with the encryption key to encrypt the location information history. Then, the encrypted location information history is encoded by Base64 and returned to the mobile communication device 3 to update the value of the cookie named "201212" (refer to FIG. 6).

When the web site is accessed, the server 1 obtains the value of the cookie named "201211" and the value of the cookie named "201212". The values are then verified by the above verification process. If the verification succeeds, it is determined whether or not to allow access by confirming if the location information history meets the predetermined requirements, for example, a predetermined visit frequency (the number of the time records) within the past one month. By this configuration, the server 1 can control the location information history of each user without saving user information.

In accordance with the automatic logon support system of the present invention, it is possible to control access to a web site without requiring user's operations.

Example 6

In accordance with Example 5, it is impossible in the user side to forge a time record which is truely encrypted. However, it is technically possible to have the server 1 improperly generate time records as desired. For example, without leaving home, the user 2 can forge current location information to be transmitted from the mobile communication device 3 as if he would be visiting the university. In accordance with Example 6, a time record is generated by the server 1 only when the mobile communication device 3 actually exists in the vicinity of the university.

Figure 7:
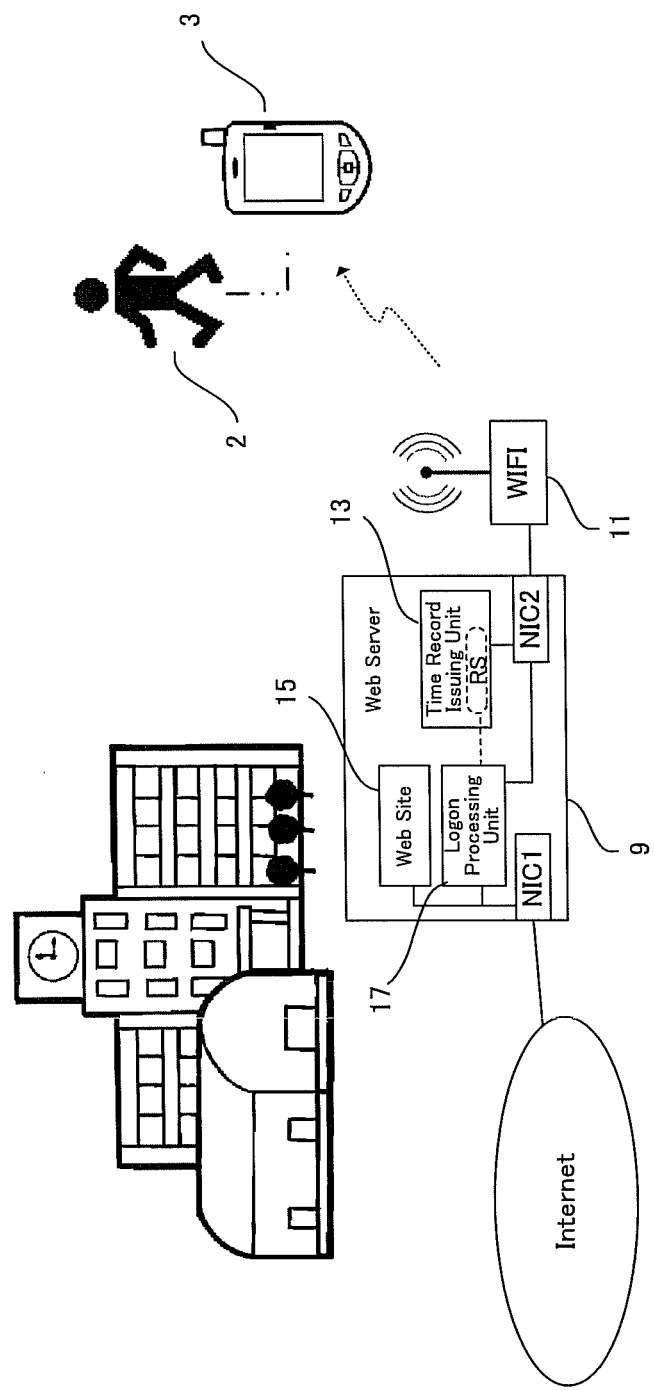
FIG. 7 is a view for showing the overall configuration of an automatic logon support system according to Example 6 of the present invention.

FIG. 7 is a view for showing the overall configuration of an automatic logon support system according to Example 6 of the present invention through which users accesses the web site 15 of the university. This automatic logon support system includes a utility program installed in a mobile communication device 3 provided with the communication capability of accessing the Internet and the capability of detecting current location information and an authentication program installed in a server 9. The server 9 is provided with a network adapter NIC1 through which the server 9 can access the Internet, and a network adapter NIC2 connected to a wireless access point (Wi-Fi communication device) 11. The network connectivity of the mobile communication device 3 includes Wi-Fi (wireless LAN) and 3G. Also, the server 9 is implemented with a time record issuing unit 13 having network functionality. The network functionality of the time record issuing unit 13 is bound only to the network adapter NIC2.

Furthermore, the server 9 includes the web site 15 of the university which is accessible through the Internet via the network adapter NIC1. The utility program of the mobile communication device 3 periodically tries to access a nearby wireless access point (typically at intervals of several minutes, for example, every ten minutes in this case). If a nearby wireless access point is found, the utility program tries to access the time record issuing unit 13. If the time record issuing unit 13 is running on the server 9, it returns a time record together with the domain name of the web site 15 of the university. The mobile communication device 3 saves the time record as a cookie. Since the time record issuing unit 13 is bound only to the network adapter NIC2 connected to the wireless access point 11, a time record is issued only to the mobile communication device 3 near the wireless access point 11. When a time record is issued, the time record issuing unit 13 receives a random number RC from the mobile communication device 3, and encrypts the time record with the random number RC and the random number RS of the server. This encryption process is same as explained above in conjunction with Example 5.

The server 9 hosts a web site 15 of the university through the network adapter NIC1 which is connected to the Internet. Also, the server 9 includes a logon processing unit which performs a logon process in response to access through the Internet. Namely, when the mobile communication device 3 access the web site 15 of the university through the Internet, the logon processing unit 17 tries to obtain the cookies of the random number RC and the location information history from the mobile communication device 3. If no cookie is returned from the mobile communication device 3, a conventional authentication process starts by requesting the mobile communication device 3 to send an ID and a password, and allows access if these are correct. If the cookies are returned from the mobile communication device 3 so that the random number RC and the encrypted location information history are obtained, the location information history is decrypted with the random number RC and the random number RS. The logon processing unit 17 of the server 9 determines whether to allow the mobile communication device 3 to access the web site 15 on the basis of whether the location information history meets the predetermined requirements. If the location information history does not meet the predetermined requirements, the server 9 returns the conventional authentication page in which the user is asked to input an ID and a password.

Meanwhile, the server 9 may provide access to the Internet through the wireless access point 11. Of course, in this case, when the mobile communication device 3 accesses the web site 15 of the university through the wireless access point 11, the logon processing unit 17 obtains the cookies of the random number RC and the location information history, followed by performing the logon process as described above. Furthermore, the service of providing Internet access through the wireless access point 11 is provided only to the user who has passed the logon process as described above with the location information history meeting predetermined requirements. In the case where this automatic logon support system is installed in a shop or the like, it is possible to attract foot traffic into the shop. For example, in a cafe, if free internet access is provided for customers having visited twice or more in the past week, it is possible to keep or grow regular customers.

Figure 8:
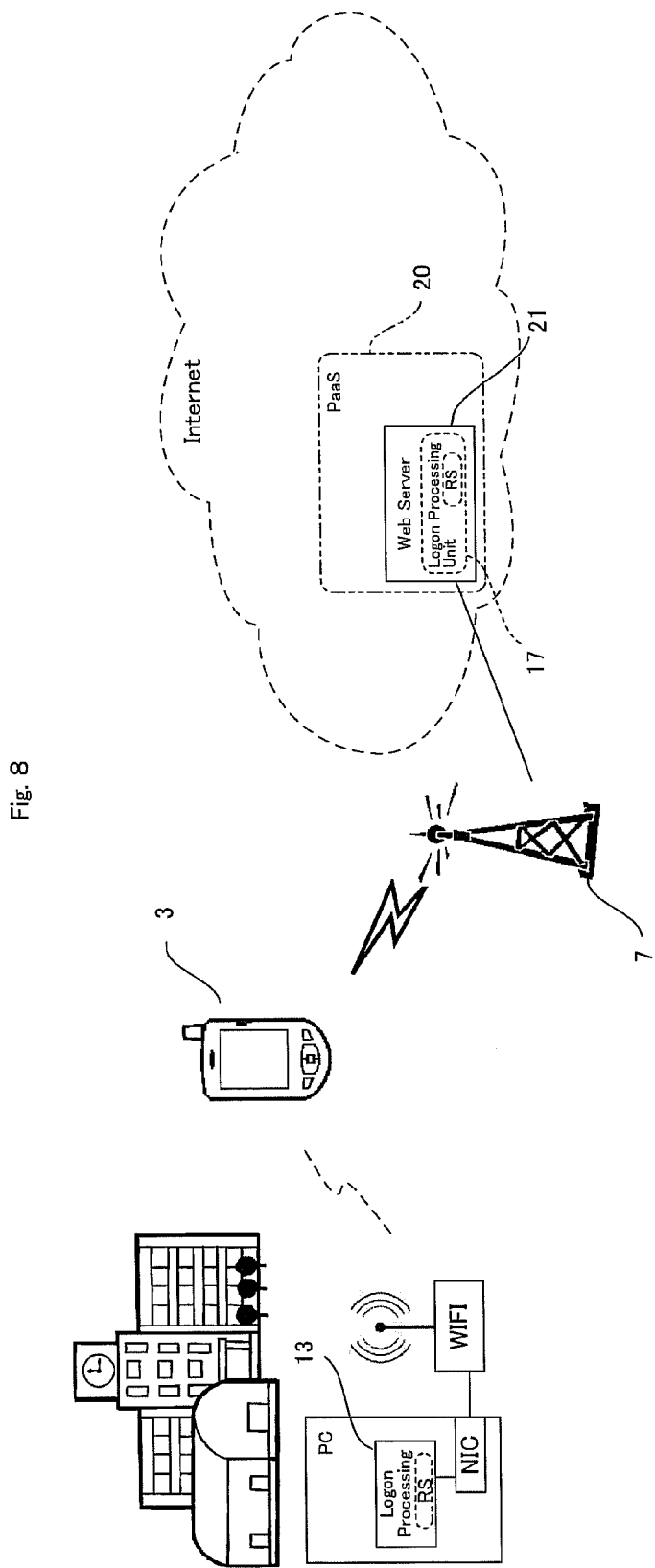
FIG. 8 is a view for showing the overall configuration of an exemplary modification of the automatic logon support system according to Example 6 of the present invention.

While the server 9 is located in the vicinity of the university together with the wireless access point 11 and hosts the web site 15 as a web server in FIG. 7, the web site 15 can be hosted by a remote computer, e.g., a cloud computing provider such as a PaaS 20 as illustrated in FIG. 8. In this case, a usual personal computer PC may be used in place of the server 9 with the time record issuing unit 13 installed therein, and the logon processing unit 17 may be installed in a web server 21 remote from the university. Of course, the same random number RC must be used both in the time record issuing unit 13 and the logon processing unit 17.

Example 7

Figure 9:
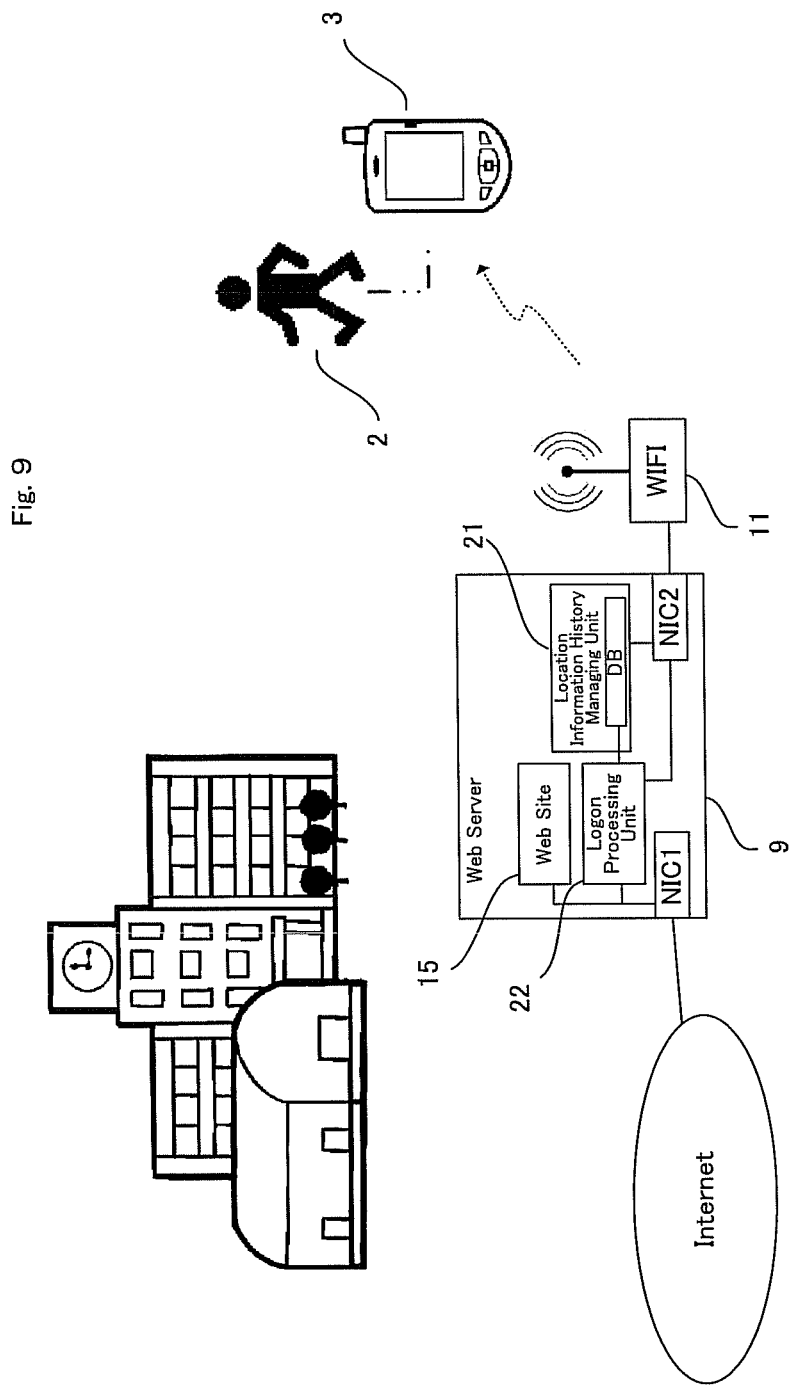
FIG. 9 is a view for showing the overall configuration of an automatic logon support system according to Example 7 of the present invention.

In the case of the above Examples, the location information history is stored in the mobile communication device 3. As has been discussed above, there is the possibility that the location information history is tampered at the user end. In this Example, the location information history is stored in the server 9 for preventing falsification in place of the use of encryption. FIG. 9 is a view for showing the overall configuration of an automatic logon support system according to Example 7 of the present invention through which users accesses the web site of the university. Like Example 6, the server 9 is provided with a network adapter NIC1 through which the server 9 can access the Internet, and a network adapter NIC2 connected to a wireless access point (Wi-Fi communication device) 11. The network connectivity of the mobile communication device 3 includes Wi-Fi (wireless LAN) and 3G. The server 9 is implemented with a location information history managing unit 21 having network functionality. The network functionality of the location information history managing unit 21 is bound only to the network adapter NIC2.

Furthermore, the server 9 includes the web site 15 of the university which is accessible through the Internet via the network adapter NIC1. The utility program of the mobile communication device 3 periodically tries to access a nearby wireless access point (typically at intervals of several minutes, for example, every ten minutes in this case). If a nearby wireless access point is found, the utility program tries to access the location information history managing unit 21. If the location information history managing unit 21 is running on the server 9, it returns the domain name of the web site 15 of the university. The mobile communication device 3 saves the identification number as a cookie. The utility program of the mobile communication device 3 transmits the cookie, if any, to the location information history managing unit 21. If no cookie is received, the location information history managing unit 21 sends a 128-bit random number as an identification number of the mobile communication device 3. The mobile communication device 3 saves the identification number as a cookie. Furthermore, the location information history managing unit 21 accumulates, in a history database DB, a pair of time records corresponding to the current time in association with the identification number. Like Example 4, each time record is an integer counted every ten minutes from 00:00 Jan. 1, 2000. However, in this case, this time record is stored as binary data without conversion to a character string by Base64. Apart from Base64 conversion, the usage and functions of the time record are the same as in Example 4.

If a cookie is received, the location information history managing unit 21 searches the history database DB for the value of the cookie (the identification number of the mobile communication device 3). If the value is not found in the history database DB, the location information history managing unit 21 sends a 128-bit random number as an identification number of the mobile communication device 3. The mobile communication device 3 saves the identification number as the cookie. The location information history managing unit 21 accumulates, in the history database DB, a pair of time records the current time in association with the identification number. If the value is found in the history database DB, the location information history managing unit 21 accumulates, in the history database DB, a pair of time records corresponding to the current time in association with the identification number.

Since the location information history managing unit 21 is bound only to the network adapter NIC2 connected to the wireless access point 11, an identification number is issued only to the mobile communication device 3 near the wireless access point 11. The server 9 hosts a web site 15 of the university through the network adapter NIC1 which is connected to the Internet. Also, the server 9 includes a logon processing unit 22 which performs a logon process in response to access through the Internet. Namely, when the mobile communication device 3 access the web site 15 of the university through the Internet, the logon processing unit 22 tries to obtain the cookies from the mobile communication device 3. If no cookie is returned from the mobile communication device 3, a conventional authentication process starts by requesting the mobile communication device 3 to send an ID and a password, and allows access if these are correct. If a cookie is returned from the mobile communication device 3, the identification number of the mobile communication device 3 can be obtained. The logon processing unit 22 queries the location information history managing unit 21 for the location information history. In the same manner as has been discussed above, the logon processing unit 22 determines whether to allow the mobile communication device 3 to access the web site 15 on the basis of this location information history. While the size of the random number generated as the identification number is 128 bits in the above example, a shorter size can be employed in accordance with the purpose. For example, 96 bits or shorter sizes may be appropriate in many cases. Also, it is possible to use a time record followed by a sojourn period as one record as described in Example 4. In this case, the sojourn period is expressed by 1-byte data so that one record consists of 4 bytes.

In the case of the above Example 7, the logon process for accessing the web site 15 is automatized by the use of the time records as the location information history. However, the web site 15 may provide a home page which can freely be accessed by anyone and a bulletin board system (BBS) or a social networking service (SNS) which can be accessed only through the above automatic logon support system. For example, if a regular drinking spot provides a home page including a link to an SNS in which is implemented the automatic logon support system according to Example 7, there may be a comfort for regular customers in the SNS where only acquainted members are exchanging information, and the SNS may become an icebreaker in the drinking spot.

The foregoing description of the embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

For example, in the aforementioned example, a pair of records is represented by four characters indicative of the date and time and one character indicative of the sojourn period. However, since the name of the cookie contains the information about the year and month, the time record redundantly includes the information about the year and month. The time record can therefore be further compressed by removing the year and month information therefrom. Since the time record is calculated in units of 10 minutes, the data without the year and month is represented by an integer of 0 to 4464 (6*24*31) which can be expressed with 13 bits. If five bits are allotted to the sojourn period, the date and time data and the sojourn period can be expressed with 18 bits in total, which are converted by Base64 to three characters. Since there is no time record corresponding to a sojourn period of 0, the sojourn period of five bits can range from 10 to 320 minutes (0 to 31).

If the difference of the latest record pair is 0, the web site deletes the record pair, followed by appending a new pair of time records. If not 0, the web site generates 13-bit time data from the former record of the latest record pair and generates 5-bit sojourn period data from the difference of the latest record pair, followed by appending the 5-bit sojourn period data to the 13-bit time data to generate a 18-bit record. The 18-bit record is encoded to three characters indicative of the date and time data and the sojourn period. the web site deletes the record pair and appends the three characters to the previous cookie data instead, followed by further appending a new pair of time records.

The invention claimed is:

1. A computer implemented method of performing an automatic logon process through the Internet to access a web site which is associated with a predetermined premises located in a predetermined location, said method comprising:

a step of collecting a plurality of records for storing information about a history of when and where each of a plurality of mobile communication devices having different residences than the predetermined location is located, wherein collection of the records is continuously repeated at predetermined intervals;

a step of evaluating, when one of the mobile communication devices tries to access the web site, the plurality of records to determine how frequently the one of the mobile communication devices has visited the predetermined location; and a step of allowing the one of the mobile communication devices to access the web site if the frequency that the one of the mobile communication devices has visited the predetermined location meets a predetermined requirement, wherein the step of collecting a plurality of records comprising:
a step of connecting one of the mobile communication devices with a wireless LAN device which is installed in the predetermined location;
a step of transmitting information about the connection between the one of the mobile communication devices and the wireless LAN device from the wireless LAN device to the one of the mobile communication devices; and
a step of storing the plurality of records in the one of the mobile communication devices on the basis of the information about the connection transmitted from the wireless LAN device.

2. The computer implemented method of claim 1 wherein the information transmitted from the wireless LAN device about the connection between the one of the mobile communication devices and the wireless LAN device is information about the current date and time which is encrypted.

3. The computer implemented method of claim 2 wherein the encryption of the information about the connection is performed by the use of a first key which is stored in one of the mobile communication devices and a second key which is not stored in the one of the mobile communication devices but stored in the web site.

4. The computer implemented method of claim 3 wherein the first key is not stored in the web site, and wherein when trying to access the web site, the one of the mobile communication devices transmits the first key to the web site.

5. The computer implemented method of claim 1 wherein the wireless LAN device is connected with the Internet, and wherein if the frequency that the one of the mobile communication devices has visited the predetermined location meets the predetermined requirement, the wireless LAN device provides Internet access for the one of the mobile communication devices.

6. An automatic logon support system implemented with a client program which would be installed in mobile communication devices each of which is capable of detecting the current location thereof and accessing the Internet and an authentication program which would be installed in web servers which are connected to the Internet and structured to deliver different web sites through the Internet, wherein the web sites are associated with predetermined premises located in different predetermined locations respectively, wherein
the client program is embedded in a computer readable medium and includes code capable of causing a computer to perform:
collecting a plurality of records which store information about a history of when and where a mobile communication device in which the client program is installed is located, wherein collection of the records is continuously repeated at predetermined intervals;
storing the plurality of records in the mobile communication device; and
accessing the web sites of web servers in which the authentication program is installed, and wherein
the authentication program is embedded in a computer readable medium and includes code capable of causing a computer to perform:
when a mobile communication device in which the client program is installed accesses the web site of a web server in which the authentication program is installed, receiving the plurality of records from the mobile communication device;
determining whether or not the mobile communication device has visited the vicinity of the predetermined location associated with the web server at a predetermined frequency on the basis of the plurality of records; and
allowing the access of the mobile communication device, without requiring a user of the mobile communication to input any credential, if the mobile communication device has visited the vicinity of the predetermined location associated with the each web server at the predetermined frequency.

7. The automatic logon support system of claim 6 wherein the client program consists of a utility program which acquires the current location information of the mobile communication device and store information about the history, and a plug-in of a browser installed in the mobile communication device for use in browsing web sites, and wherein the plug-in acquires the history when opening a web site of a web server in which the authentication program is installed.

8. The automatic logon support system of claim 7 wherein the utility program acquires the current location information of the mobile communication device by GPS, Wi-Fi triangulation, and/or cell phone tower triangulation.

9. An automatic logon support system implemented within a plurality of web servers which are connected to the Internet and structured to deliver different web sites through the Internet and a plurality of mobile communication devices each of which is capable of detecting the current location thereof and accessing the Internet, wherein the web sites are associated with predetermined premises located in different predetermined locations respectively, each of the mobile communication devices being capable of
collecting a plurality of records which store information about a history of when and where this each mobile communication device is located, wherein collection of the records is continuously repeated at predetermined intervals;
storing the plurality of records in the mobile communication device; and
accessing the web site of each of the web servers;
each of the web servers being capable of
receiving, when one of the mobile communication devices accesses the web site of the each web server, the plurality of records from the one of the mobile communication devices;
determining whether or not the one of the mobile communication devices has visited the vicinity of the predetermined location associated with the each web server at a predetermined frequency; and
allowing the access of the one of the mobile communication devices, without requiring a user of the mobile communication to input any credential, if the one of the mobile communication devices has visited the vicinity of the predetermined location associated with the each web server at the predetermined frequency.

10. An automatic logon support system implemented with a web server connected to the Internet and associated with a predetermined premises, a mobile communication device which is capable of detecting the current location thereof, accessing the Internet and has a wireless LAN connectivity, a wireless access point of the wireless LAN installed in the predetermined premises, and a time record issuing unit connected to the wireless access point, the mobile communication device being configured to access the wireless access point when the mobile communication device visits the predetermined premises, the time record issuing unit being configured to be notified of the access of the mobile communication devices through the wireless access point, creating a time record of the access, encrypt the time record, and transmit the encrypted time record to the mobile communication device through the wireless access point, the web server being configured to receive the encrypted time record from the mobile communication device desiring access to the web server, decrypt the encrypted time record, determine whether the encrypted time record is correctly decrypted and whether the mobile communication device has visited the predetermined premises at the predetermined frequency on the basis of the decrypted time record, and allow the mobile communication device to access the web server if the mobile communication device has visited the predetermined premises at the predetermined frequency.

11. The automatic logon support system of claim 10 wherein the web server is configured to deliver a web site through the Internet, a browser is installed in the mobile communication device, and the mobile communication device receives the encrypted time record as a cookie of the browser.

12. The automatic logon support system of claim 10 wherein the time record issuing unit encrypts the time record with a first key stored in the time.

* * * * *